United States Patent [19]
Lapeyre et al.

[11] 3,870,141
[45] Mar. 11, 1975

[54] MODULAR BELT

[75] Inventors: James M. Lapeyre; Fernand S. Lapeyre, both of New Orleans, La.

[73] Assignee: The Laitram Corporation, New Orleans, La.

[22] Filed: Oct. 8, 1971

[21] Appl. No.: 187,746

Related U.S. Application Data

[63] Continuation-in-part of Ser. No. 63,523, Aug. 13, 1970.

[52] U.S. Cl. ............................. 198/193, 198/189
[51] Int. Cl. ............................................ B65g 15/32
[58] Field of Search .......... 198/189, 193, 198, 196, 198/184; 74/235

[56] References Cited
UNITED STATES PATENTS

| | | | |
|---|---|---|---|
| 124,966 | 3/1872 | Mellor | 126/167 |
| 1,274,385 | 8/1918 | Colburn | 198/189 X |
| 2,165,422 | 7/1939 | Stanius | 198/189 |
| 2,488,872 | 11/1949 | Mathieu | 198/193 |
| 2,737,755 | 3/1956 | Schigas | 46/16 |
| 2,911,091 | 11/1959 | Imse | 198/189 |
| 3,233,722 | 2/1966 | Vorgensen | 198/196 |
| 3,245,518 | 4/1966 | Reibel et al. | 198/198 |
| 3,269,523 | 8/1966 | Creswell | 198/189 x |
| 3,352,407 | 11/1967 | Wright | 198/189 |
| 3,602,364 | 8/1971 | Maglio | 198/193 |
| 3,646,752 | 3/1972 | Kampfer | 198/189 X |

*Primary Examiner*—Evon C. Blunk
*Assistant Examiner*—James W. Miller
*Attorney, Agent, or Firm*—Schiller & Pandiscio

[57] ABSTRACT

A chain link conveyor comprises modules pivotally connected to one another. Each module is designed to be molded as a unit, preferably of an organic plastic material and comprises a number of parallel, spaced links having end sections with aligned holes for snap-together pivot rods, and intermediate sections joined by integral cross members to form a rigid, supporting grid.

28 Claims, 14 Drawing Figures

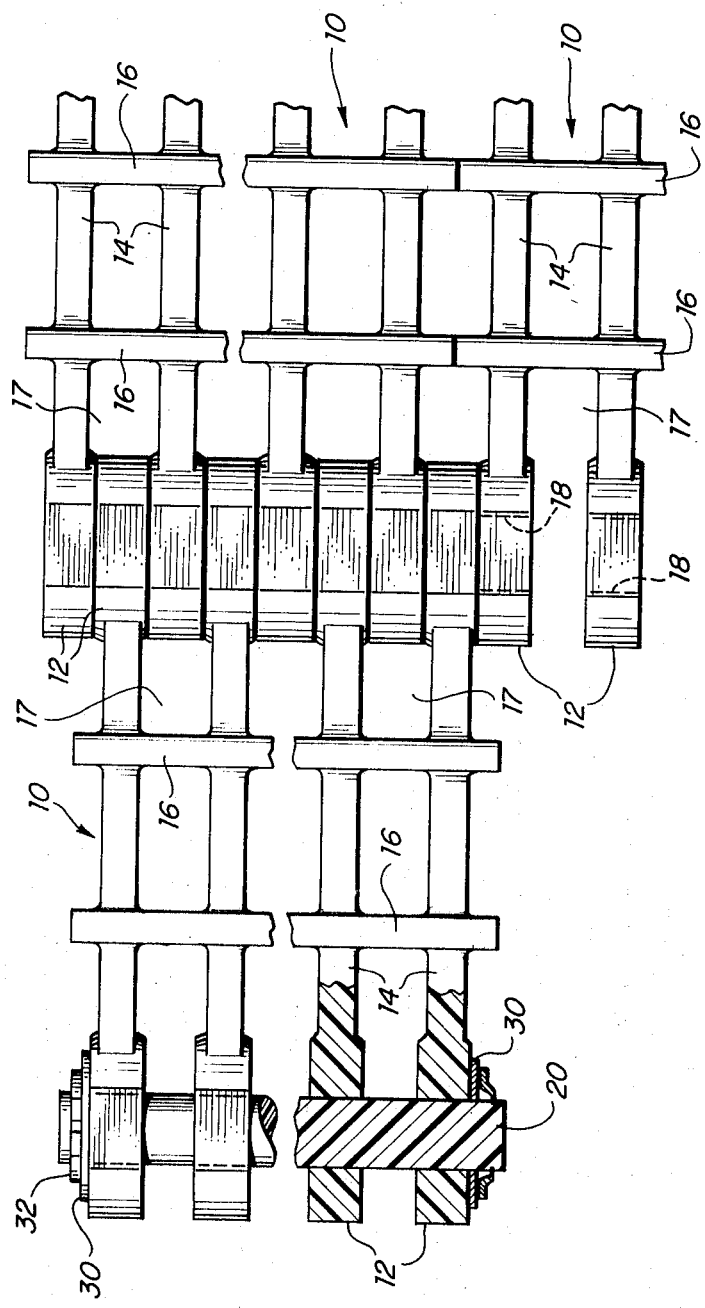
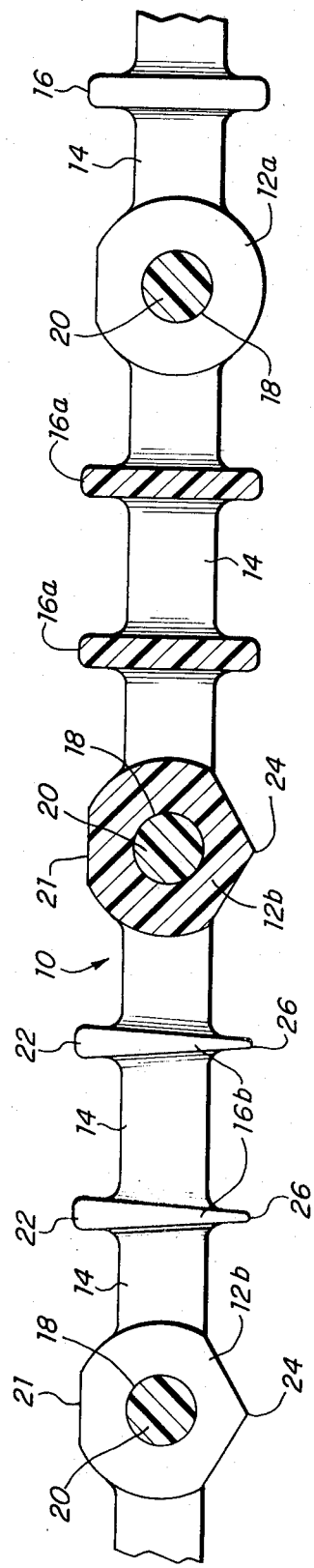
FIG. 1.
FIG. 2.

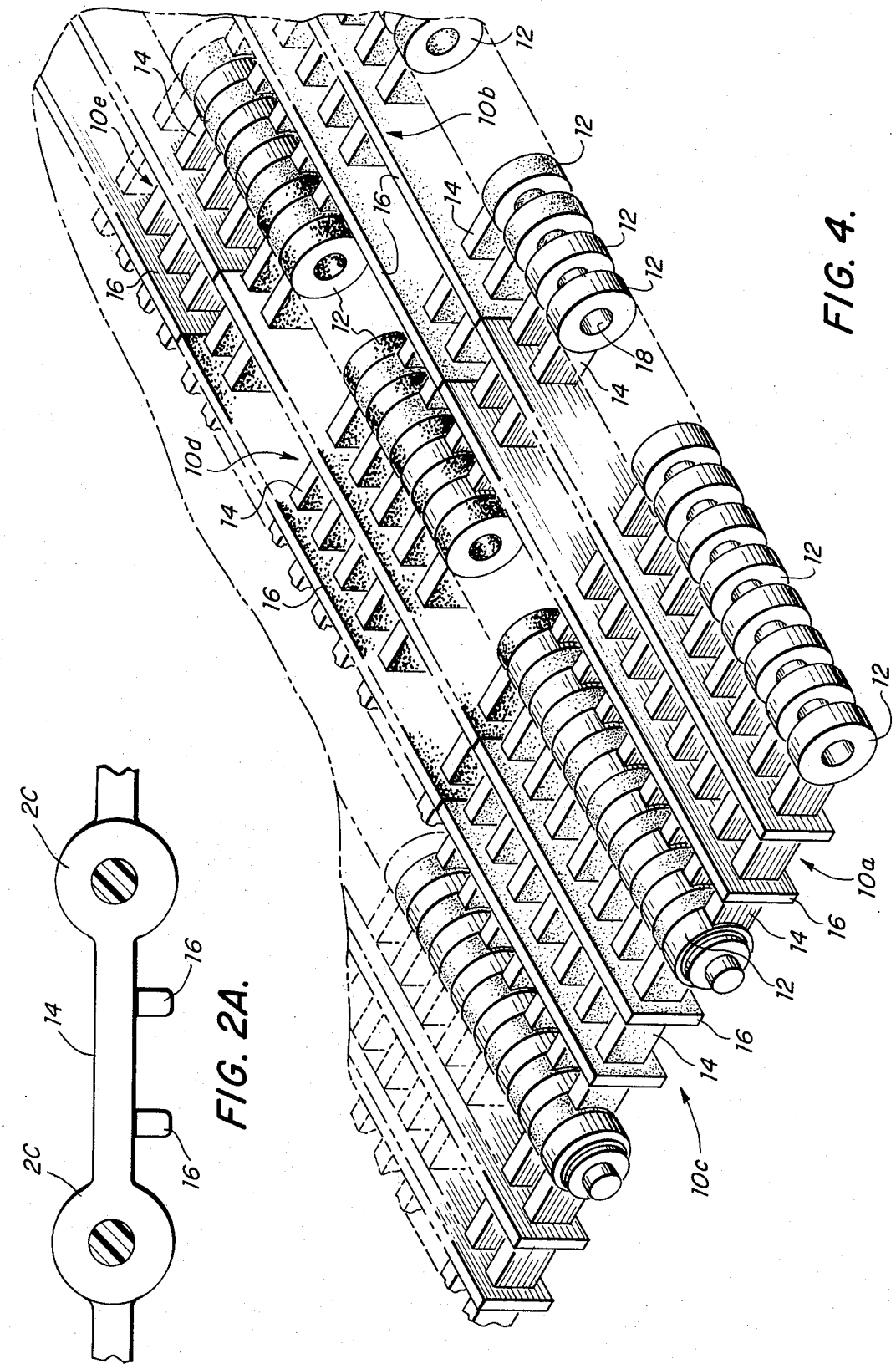

MODULAR BELT

This application is a continuation-in-part of United States Patent Application Ser. No. 63,523 filed Aug. 13, 1970.

This invention is concerned with conveyors and particularly with a novel and improved conveyor comprising connected modules each comprising a plurality of preassembled link-like elements.

Chain link conveyors typically comprise an endless chain of links each pivotly connected at its ends to adjacent links. In the simplest form of conveyor construction, each link is formed with an opening at opposite ends for mounting on pivot pins, and a conveyor of a particular length and width is obtained by assembling a large number of individual links on each pin with alternate links being mounted at opposite ends. The fabrication, handling and assembling of a large number of individual links to provide an endless conveyor can be a time-consuming and costly process unless automatic manufacturing tools and assembly machinery are employed; these tools and machinery usually represent a substantial expense.

Objects of the present invention are to provide a novel and improved conveyor module comprising a multiplicity of preassembled link-like elements arranged so that the module is end-to-end mateable and reversible, i.e., a module will be able to be connected to or mate with a like module at their ends regardless of which end of which module is employed; to provide a conveyor module as described in the form of an integral unit adapted to production by conventional molding processes; and to provide a conveyor module that is simple and inexpensive to manufacture and assemble to form a conveyor belt, mat or the like.

Chain link conveyor belts composed of individual links tend to place severe lateral and bending stresses on the pivot rods which are required to prevent lateral separation of the links, and bending or deformation of the conveyor links or pins from a planar or linear configuration.

Thus, additional objects of the invention are to provide a conveyor module comprising a multiplicity of link-like elements formed together as a unit with integral cross members forming a rigid grid structure adapted to resist lateral and bending stresses; and to provide a conveyor belt comprising a multiplicity of the modules arranged in side-by-side relation in rows with the modules in each row staggered with respect to the modules of adjacent rows so that the joints between modules of each row are located or centered with respect to the modules of adjacent rows.

Important considerations in the design and construction of a chain link conveyor include: ruggedness and dependability, that is, whether it is easily deformed or broken; weight, because it is an important factor with regard to power requirements and sprocket design; the nature of the material or objects to be conveyed, that is, whether the object or materials will be supported as required, fall through, be marred or scratched or otherwise damaged; ease of disassembly and repair; operating life; and the environment in which the conveyor is to operate particularly as it relates to and is affected by the nature and composition of the material conveyed. For example, the conveyor may be required to operate in a highly corrosive environment such as salt water, or it may be employed to convey foods thereby making ease and manner of cleaning essential considerations while prohibiting the use of lubricants that might contaminate the material being conveyed.

The solution to these problems is achieved by another object of the invention, namely, the provision of a linked conveyor module that can be formed of organic plastic material by conventional molding processes and is structured to permit the use of pivot pins also formed of organic plastic material.

Other objects of the invention will, in part, be obvious and will, in part, appear hereinafter.

The invention accordingly comprises the apparatus possessing the construction, combination of elements and arrangement of parts, which are exemplified in the following detailed disclosure, and the scope of the application of which will be indicated in the claims.

For a fuller understanding of the nature and objects of the invention, reference should be made of the following detailed description taken in connection with the accompanying drawings wherein:

FIG. 1 is a fragmentary, plan view of a portion of a conveyor belt embodying the invention illustrating conveyor modules and parts thereof as assembled;

FIG. 2 is an elevational view, partially in section, of a conveyor illustrating various module configurations;

FIG. 2A is a side view of another embodiment of a module incorporating the principles of the present invention;

FIG. 4 is a perspective view, partly broken away and partly in fragment, of a portion of a conveyor belt embodying the invention;

Figure 3:
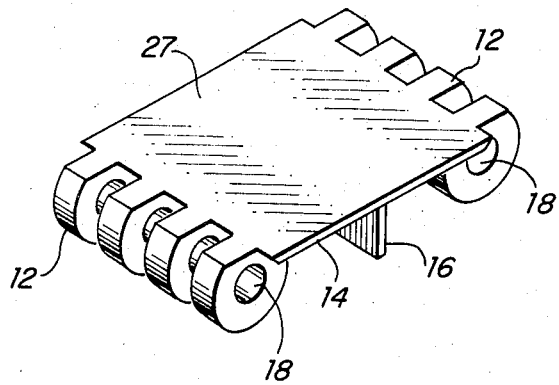
FIG. 3 is a perspective view of another embodiment of a module incorporation the principles of the invention.

Reference is now made to FIGS. 1 and 2 of the drawings wherein there is illustrated one embodiment of chain link conveyor modules embodying the invention. These modules generally designated 10 are designed to be formed as an integral unit by a conventional molding process, for example, injection molding. Module 10 comprises a multiplicity of elongated, parallel, spaced link-like elements, for example, twenty-four or one hundred twenty. Thus, in the form shown, the length dimension of the module is equal to the length of each link and the width is determined by the number of links.

All of the link-like elements are substantially identical and each includes end sections 12 joined by an intermediate or connecting section 14 having a generally rectangular cross section with a greater depth than width. The link-like elements are joined as a unit by at least one and preferably a pair of spaced cross-members 16 formed integrally with connecting sections 14 to form a rigid open or perforated structure. End sections 12 are wider and deeper than connection sections 14 and are formed with parallel planar facing surfaces each spaced from adjacent surfaces by just slightly greater (e.g., 0.003) than the thickness (width) of the end sections so that the end sections of the link elements of each module fit snugly but movably between the end sections of every module with the parallel facing surfaces in contact with one another. Each of end sections 12 is formed so as to circumscribe a corresponding one of aligned holes 18 for receiving pivot pins or rods 20 adapted to pivotly connect the modules end-to-end while laterally aligning adjacent modules. The ends of each cross-members extend beyond the intermediate sections of the lateral link-like elements to planes spaced from the center surfaces of the end section by half the thickness thereof so that cross-members of laterally adjacent modules will abut one another when assembled as a conveyor belt. Cross-members 16 function to maintain the link-like elements in parallel relation so that the faces of end section 12 are kept parallel and pivot holes 18 are kept aligned, thereby minimizing bending stresses across rods 20.

End sections 12 have at least a partially circular cross-section (when viewed in side elevation) and a depth equal to the depth of cross-members 16 so that both portions of the upper and lower edges or surfaces of the end sections and cross-members are located in substantially parallel planes, for self-supporting a belt made of a number of coupled modules as well as articles carried thereon.

Movement of pivot pins or rods 20 along the axes of the latter with respect to the modules can be limited by conventional means on the ends of the rods such as a washer 30 and C-ring 32 engaged in an annular groove in the rod, or a cap nut, washer, or similar device for engaging the rod so as to be axially fixed. Alternatively, a C-ring can be retained in place by the simple expedient of expanding the end of a rod by applying heat and pressure thereto. Also, one end of each rod can be performed with a head, and the other end expanded after insertion, for example simply by heating the polymeric material until it forms a bead or globular head.

The modules may take a number of different configurations depending upon the nature of the material or objects to be conveyed. Some examples of alternative configurations are shown in FIG. 2 and include a simple, high-strength structure for conveying irregularly shaped objects or materials that may be randomly arranged and may be washed, dried, heated, cooled, etc., with liquid or gas, while being carried on the conveyor. The deep, thin, rectantular cross-sectional configuration of ribs 16a provides a strong, rigid open grid with spaces for the passage of gas or liquids used in treating the conveyed materials. The circular cross-section of end sections 12a has the advantage that the end sections cannot become enmeshed with the conveyed material regardless of the degree of relative pivotal motion of adjacent links. Further, end sections 12a provide a cylindrical surface for engagement by sprocket teeth which may be used to drive a belt forward of the modules.

The end sections and cross-members can be configured to provide for either maximum or minimum supporting surface area. For example, to provide for a supporting surface of increased area for carrying objects such as cans or bottles which are required to remain upright while the module remains open for drainage, the end sections and cross-members may be shaped as shown in FIG. 2 at 12b and 16b respectively. In this embodiment, cross-members 16b are tapered to provide enlarged common-planar surfaces 22 and end sections 12b are formed with planar surface sections 21 lying in the common plane or surface sections 22.

When minimum contact area is desired as when the lower surfaces of objects are to be treated with a liquid or gas, or maximum drip area is required, each end section 12b may be formed with surfaces converging to a linear ridge or sharp edge 24 and cross-members 16b are tapered to narrow (knife) edges 26. Ridges 24 and edges 26 are all preferably parallel and lie in the same plane as shown in FIG. 2, except that they will be on the upper supporting surface of the conveyor. When both sides of the conveyor are to be used to support articles or materials requiring minimum contact area, opposite sides of the end sections are provided with ridges 24 and the cross-members may be double tapered so as to have a diamond-shaped cross-section which, it should be noted, is convenient to mold.

The upper portion of cross-member 16 can be cut or formed to match the level of the upper surfaces of the intermediate portions 14, as shown in FIG. 2A, thereby lying below the upper edges of end-sections 12c and providing a well to carry articles.

The top surface of cross-members 16 and intermediate portions 14 can be made continuous to provide a simple supporting surface 27 for each module as shown in FIG. 3. In this latter embodiment it will be clear that surface 27 and the waffle-like structure supporting surface 27 (formed of the intermediate portions of the link-like elements and the cross-members) provide a rigid structure separating two pluralities of link end sections 12.

A multiplicity of modules 10 are assembled in end-to-end and side-by-side relation to form a conveyor by pivot rods 20. Cross-members 16 function to absorb lateral forces on the link-like elements tending to separate the links, as well as bending forces on the modules tending to bend the pivot pins. Additionally, where the end sections are formed with parallel planar facing surfaces spaced so that the end sections of another like module fit or mate snugly, yet with a minimum of friction, the fit of the end sections contributes significantly to the ability of pivot-connected modules to resist deformation due to bending forces across the axis of the pivot pin. Thus, each pivot pin is subjected primarily to a large number of small shear forces so that the strength requirement for the pivot pins are small as compared with a conveyor composed of individual chain links. The use of circumscribed holes 18, i.e., holes completely surrounded by the material of the end section, of course permits the pins to positively lock respective modules together while permitting independent rotation of end-to-end connected modules about the pins. To add strength to a conveyor made up of rows of modules located side-by-side, the modules of each row are staggered with respect to the modules of adjacent rows as shown in FIG. 4, in which different modules are designated 10a, 10b, 10c, 10d, and 10e. In this way, the joints of adjacent modules in each row fall at an intermediate position, typically midway between the sides of adjacent modules in the next row so that, in effect, the cross-members overlap to resist bending stresses which might otherwise be transmitted to the pivot pins. A conveyor of any desired width can be formed by employing whole modules or portions thereof as shown in FIG. 4.

Figure 10:
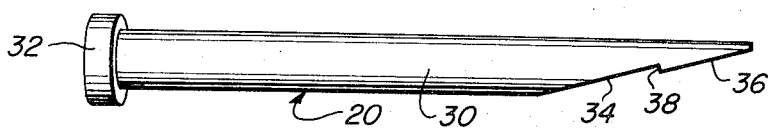
FIG. 10 is a perspective drawing of a preferred pivot pin in the present invention.

Referring now to FIG. 10, there is shown a preferred form of pivot pin 20 for use in the present invention, and comprising a pin body or shaft 30 of generally cylindrical form having a button head 32 integrally formed therewith at one end. Head 32 has a larger cross-section radius than shaft 30. The other end of the pin is formed with a pair of planar bevel surfaces 34 and 36 extending parallel to but displaced from one another so as to be not coplanar, at an acute or bevel angle (e.g., 30°) to the axis of shaft 30. Surfaces 34 and 36 are bound at an edge of each by ridge 38 which is preferably a flat surface disposed perpendicularly to the axis of shaft 30. Ridge 38 and surface 34 thereby form a groove extending across the axis of shaft 30 and facing back toward head 32. Preferably, pin 20 should be formed of a material such as a molded synthetic plastic which can be distorted under pressure.

Figure 5:
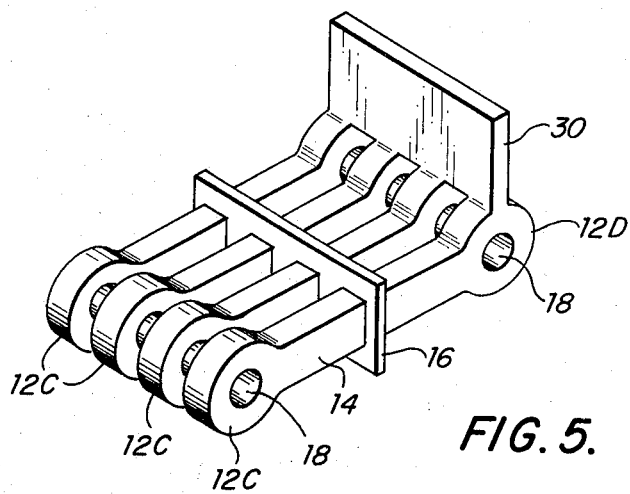
FIG. 5 is a perspective view of an alternative form of the module of the invention.

In yet another alternative version a module is provided, as shown in FIG. 5, which includes the same connecting section 14 joined by cross-member 16 and having at least one group of end sections 12c at one end of the module. End sections 12c have the same aligned pivot holes 18 and the end sections 12 also have opposed parallel aligned faces. However, in place of another similar end section at the opposite end of the module, the latter includes end sections 12d which, just as before, possess corresponding aligned pivot holes 18 and parallel opposed faces, also include a plate or flight 30 which is integrally attached to or formed with the top surfaces of the end sections 12d and projects substantially parallel to cross member 16 and perpendicularly to the common surface defined by the top edge of end sections 12c and to cross member 16. Such a module gains additional strength from flight 30 which serves as an additional cross member and also, but primarily, functions when combined into a conveyor belt formed of such modules, to prevent materials or items being conveyed from slipping along the conveyor belt as the latter, for example rises along an angle from the horizontal. Alternatively, plate 30 can, instead of projecting from end sections 12d, be formed integrally to project from one of cross members 16, thereby constituting a dividing flight for the conveyor.

Figure 6:
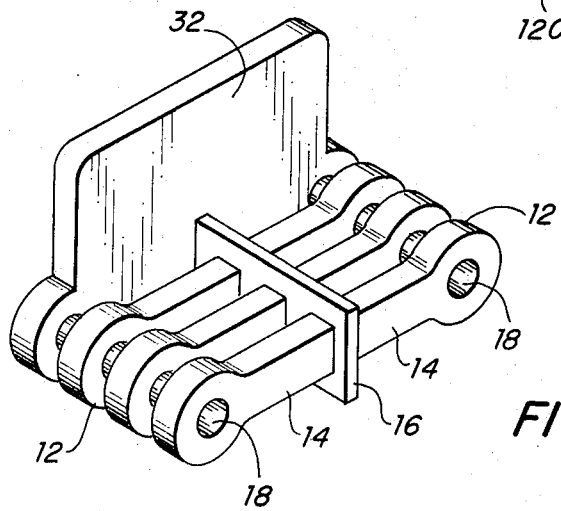
FIG. 6 is a perspective of yet another alternative form of a module incorporating the principles of the present invention.

Another special module is shown in FIG. 6 and includes the usual cross-member 16 binding a plurality of link-like elements together to form an integral module having intermediate sections 14 joining a pair of groups of end sections 12 having the desired aligned pivot holes 18. Integrally formed with the module is an upstanding flat plate 32 substantially parallel to the link-like elements and extending perpendicularly to the common plane defined by the top edges of edge sections 12 and of cross member 16. It will be seen that the embodiment of FIG. 6 is quite similar to that of FIG. 5 except that plate 32 is perpendicular to cross-member 16 whilst flight 30 is parallel to cross-member 16. Plate 32 is preferably disposed at an edge of the module, so these can function as an edge shield on a conveyor belt which will prevent articles on the belt from falling off the sides of the latter.

Figure 7:
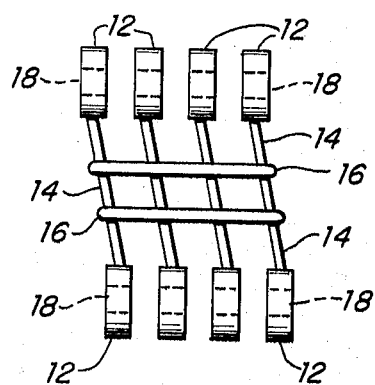
FIG. 7 is a schematic plan view of yet another alternative form of a module incorporating principles of the present invention.

The modules heretofore described may also be modified in other ways. For example, the module of FIG. 1 is arranged so that each intermediate portion 14, each cross member 16 and the common axis of holes 18 in each group of end sections 12 all form a rectangular pattern. When such modules are assembled as in FIG. 1 to form a belt or mesh or mat, the openings such as 17 between adjacent end sections 12 of one module are offset the width of an end section 12 with respect to corresponding openings 17 of the other or connected module. Thus, to drive each successive module with a wheel having sprokets intended to fit into openings 17, we must provide a wheel with sprockets which alternately are offset from one another by the width of an end section 12 of the modules. A sprocket wheel having a series of successive in-line sprockets can be used however if the "offset" is provided in the module itself. To this end, as shown in FIG. 7, a module can be provided in which the axes of holes 18 of opposite groups of end sections 12 are parallel and all but one of each end section 12 of the group at one end of the module lie along lines perpendicular to the axes of holes 18 and extending between the end sections 12 of the group at the other end of the module. To achieve this, intermediate sections 14 of each link-like element lie along a straight line which meets corresponding end sections 12 at a slight angle.

Figure 8:
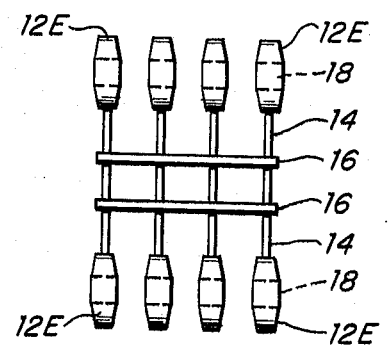
FIG. 8 is a schematic plan view of yet another alternative form of a module of the present invention.

Another modification of the module of the invention is shown in FIG. 8 which is identical to the embodiment of FIG. 1 execpt that end sections 12e do not have plane parallel facing surfaces. Instead, as shown, each end section is shaped as a hollow cylinder having opposite ends capped with a pair of inwardly converging truncated hollow cones. When such modules are coupled as hereinbefore described the interspace between adjacent end-sections 12e will be a wedge-shaped annulus which will tend to be easier to clean than a flat annulus. Hence, while the embodiment of FIG. 8 will provide a conveyor which will have a lessened resistance of bending stresses because opposite faces of end sections 12 are not in substantially parallel contact, it is easier to clean and/or sterilize so may be preferred for food-handling conveyors or the like.

Figure 9:
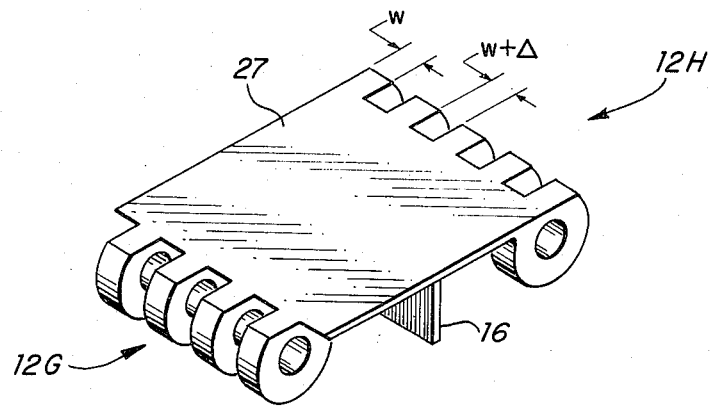
FIG. 9 is a perspective view of an additional embodiment of a module incorporating principles of the present invention.

While in each embodiment described thus far, the number of end sections in one group at one end of a module is the same as the number of end sections in the other group at the other end of the module, an alternative version may have an odd number of end sections in one group and an even number of end sections in the other group. The embodiment shown in FIG. 9 is a variation of the embodiment of FIG. 3, in that it includes common surface 27 and cross-member 16. Both embodiments are shaped, in plan, roughly rectangularly (ingoring the interspaces between end sections 12). However, whereas the device of FIG. 3 contains the same number of end-sections at opposite ends of the module, the device of FIG. 9 includes at one end within a given length a group 12g dimension of $n$ end-sections of width W and interspaced by a distance (W + Δ) where Δ is a very small increment (e.g., 0.003) only sufficient to permit the desired low-frictional, rotational motion of intermeshed end-sections as previously noted. The other end of the module includes within the same given length a group 12h of $n+1$ end-sections of the same characteristics and interspaced as the end-sections of group 12g. Such a module is end-to-end reversible much as is the module of FIG. 3 except that if group 12g of one such module is pinned to group 12h of another such module, the module side edges are aligned. If a group 12g of one module is pinned to group 12g of another module, the module edges are staggered. In other words, if like end-section groups of modules such as those of FIG. 9 are pinned together, the side edges are staggered much as occurs with the embodiment of FIG. 3 except that the number of shear points on the pins will be reduced on one or both sides when a number of such modules are also aligned edge to edge. When unlike end-section groups of such modules are pinned together, the side edges are aligned and the number of shear points is minimized.

Figure 11A:
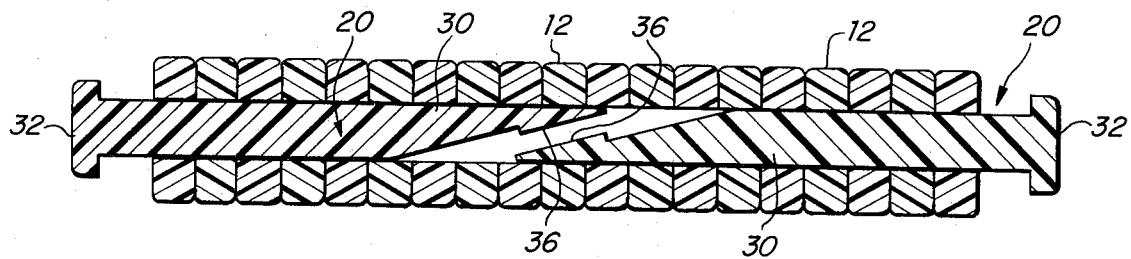
FIG. 11 is a series of cross-sectional views showing installation of a pair of pivot pins of FIG. 10 used to hold the modules of the invention together.
Figure 11B:
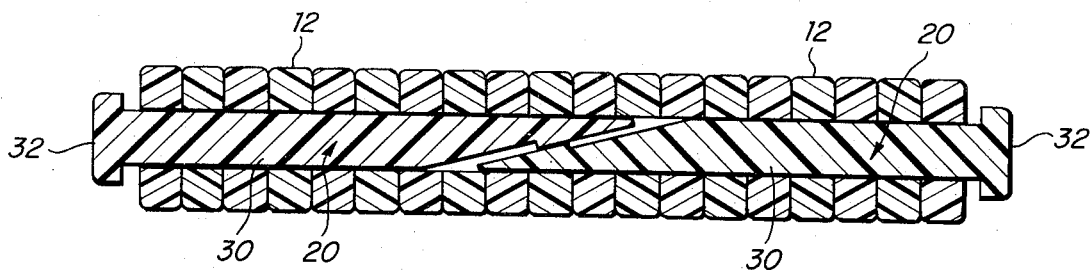
Figure 11C:
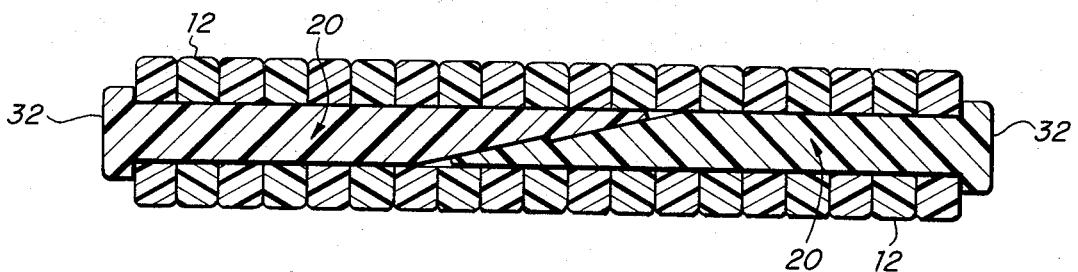

As shown in FIGS. 11A and 11C inclusive, pins such as that of FIG. 10 are preferably used in pairs to pivotally connect modules of the invention together. Typically, a pair of pins 20 are inserted into the pivot holes at opposite ends of matched end sections 12 of modules of the invention, with the beveled surfaces 36 of each pin indexed so they can contact one another as shown in FIG. 11A, face to face. By forcing the two pins toward one another axially, surfaces 36 slide one over the other as shown in FIG. 11B and the axial force tends to force the pins to expand slightly laterally thus forcing the "barrel," formed of end sections 12, also to expand slightly. Thus, ridges 38 override one another and mate or lock together as shown in FIG. 11C. Of course, once locking occurs, any lateral pressure on the "barrel" is relieved, and the latter tends to contract to hold the pins in positive engagement.

The pin structure shown in FIGS. 10 and 11 is preferred for a number of reasons: each pin is the same for a conveyor belt of given width, thus minimizing manufacturing and inventory costs, and for food processing conveyors, it serves to reduce irregularities and cavities which are bacteriologically undesirable. Also, importantly, it permits replacement of conveyor sections or modules with a minimum number of simple tools. For example, one needs only a cutting device such as a saw to remove one head 32 to permit removal of the entire pivot pin assembly from the opposite end. To reassemble the conveyor, one need only to replace the conveyor section, insert and index new pins and then apply manual pressure on the pin ends.

A typical use of a conveyor providing a severe test of its design is in the processing of food products involving a corrosive liquid such as salt water. Heretofore, conveyors for such purposes have been formed of stainless steel to resist corrosion and permit cleaning including, for example, the use of detergents and steam. Understandably, such conveyors are difficult and expensive to fabricate and assemble; are heavy thus necessitating substantial and expensive supporting and driving sprockets and requiring large amount of power to operate; wear out rapidly because of the difficulty in providing for lubrication; tend to break when bent or stressed; and are difficult to repair. The conveyor module is intended to be formed of a relatively light weight, organic polymeric plastic material such as polyethylene, polypropylene, polycarbonate, or the like, which is compatible with corrosive liquids and atmospheres and can be formed by conventional molding processes. Thus, each module represents a substantial saving both in material and manufacturing costs over metallic links such as stainless steel.

Modules of open or perforate structure surface such as those of FIG. 1 or of irregular shape such as those of FIG. 5 and 6 are preferably made as integral modules by integral modules by injection molding techniques. Thus one forms a two-part mold defining the structure shown as in FIG. 1, FIG. 5 or FIG. 6, and injects into the mold, a quantity of synthetic polymeric material, such as melted polyethylene or the like, sufficient to fill the mold. The use of multiple molds is of course preferred for high production rates.

However, a module such as is shown in FIG. 3 can readily be made by continuous extrusion through a die having the shape of a cross-section of the module taken along a plane extending perpendicularly to surface 27 and to the axes through holes 18 in opposite link ends of the module. Thus, rib 16, holes 18 and surface 27 can be formed at the same time be extruding the molten plastic through the die and cooling the extruded slab to form a substantially rigid structure. The spaces between link-ends must then be provided by machining or cutting in from opposite edges of the extruded slab. This latter method provides a continuous production technique for manufacturing modules of any desired number of link ends with the same equipment and from the same die.

In one embodiment of the module of the invention, the polymer is impregnated with an antibiotic to provide a self-sanitizng antibacterial plastic such as is available from Medical Plastics Corporation of America, Greensboro, N.C. under the trademark "Medi-Guard." It is believed that, for example, an antibiotic such as tetracycline incorporated into polypropylene will bleed slowly from the polymeric material when the latter is moistened, thereby tending to reduce bacterial growth on the polymer. In order to keep the pivot joints reasonably sterile, it is believed that it is sufficient that only the pivot rod be made of the antibiotic impregnated polymer.

As previously noted, another advantage of the modular conveyor construction of the invention is that the stresses on the pivot pins are so small and of a nature which permit the pins to be formed of synthetic polymeric materials so that the conveyor may be essentially all plastic with a minimum, if any, metallic components. With pivot pins, of appropriately selected polymers, substantially no lubrication is required and wear is minimal. Replacement of modules is a simple matter and hand assembly of a conveyor belt is economically possible as would not be the case with individual conveyor links. It will be seen from the foregoing that, in addition to those already enumerated, the advantages of this invention include:

a. High tensile strength conveyor resulting from the pivot pins or rods being in multiple shear.

b. Wide conveyors are possible because of the strength of the cross members, offsetting of modules and intermeshing of module links.

c. Resistance to breaking resulting from the flexibility of polymeric materials.

d. Polymeric materials will not scratch or mar many articles that might be damaged by metal conveyors.

e. The close-fitting joints at the end sections of the links are self-cleansing.

f. The conveyor can be driven by sprockets engaging the cylindrical barrel of material comprising the link end sections surrounding each pivot pin.

g. Polymeric plastics such as polyethylene are resistant to the build up of film and deposits.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A module for constructing linked structures, said module comprising, in combination:
   a first plurality of link ends of substantially identical width, each being formed to circumscribe a pivotal hole, said holes of said first plurality being arranged coaxially;
   a second like plurality of link ends of substantially indentical width, each being formed to circumscribe a pivotal hole, said holes of said second plurality being arranged coaxially, the axes of respective holes of both pluralities of link ends being substantially parallel; and
   a plurality of spaced apart elongated members each integrally formed with and joining a pair of corresponding link ends of said first and second pluralities, said members being joined by at least one cross rib also formed integrally therewith and extending parallel to said axes;
   said link ends being dimensioned and spaced apart by a distance slightly greater than said width so that said module is end-to-end reversible, so that a plurality of said modules may be engaged with each other at said ends.

2. A module as defined in claim 1 formed as an integral unit of a synthetic polymeric material.

3. A module as defined in claim 2 wherein said material includes an antibiotic incorporated therein.

4. A module as defined in claim 1 wherein the thickness of said members is less than the thickness of said link ends.

5. A module as defined in claim 1 wherein said cross rib, said link ends and said member are formed with flat edge faces lying substantially in a plane to provide a supporting surface with an area greater than the area of the perforations through said module.

6. A module as defined in claim 1 wherein said cross rib and said links ends are formed with surfaces converging to relatively narrow or sharp, parallel ridges lying in substantially the same plane to provide a supporting surface with an area less than the area of the perforations through said module.

7. A module as defined in claim 1 wherein said cross rib and said members have integrally formed therewith a substantially plane, inperforate, unitary surface.

8. A module as defined in claim 7 wherein a portion of the edge of each said link ends is formed substantially flattened so as to lie in said plane.

9. A module as defined in claim 1 wherein said link ends have generally circular cross sections symmetrical with respect to said aligned openings, and said rib and said members have generally rectangular cross sections.

10. A module as defined in claim 1 wherein the width dimension of said module is at least equal to the maximum distance between the link ends of one plurality and the link ends of the other plurality.

11. A module as defined in claim 1 wherein the width dimension of said module is at least twice the maximum distance between the link ends of one plurality and the link ends of the other plurality.

12. A module as defined in claim 1 wherein the ends of said rib extend laterally beyond the outside faces of the lateral link ends of said module to a plane spaced from the last mentioned faces by approximately one half the thickness of said link-ends so as to abut the rib of a laterally adjacent module when assembled as part of a conveyor.

13. A module as defined in claim 1 including a substantially flat plate formed integrally with and projecting outwardly from said module substantially perpendicularly both to a common plane through said axes and to said axes.

14. A module as defined in claim 13 wherein said plate lies substantially along an edge of said module.

15. A module as defined in claim 1 including a substantially flat plat formed integrally with and projecting outwardly from said module parallel to said axes and substantially perpendicularly to a common plane through said axes.

16. A module as defined in claim 1 wherein said link ends are formed with substantially parallel planar facing surfaces.

17. A module as defined in claim 1 wherein said link ends are formed so that facing surfaces thereof are shaped substantially as inwardly converging truncated cones.

18. A module as defined in claim 1 wherein each one of said link ends of said first plurality and a corresponding one of said link ends of said second plurality lie on a common line perpendicular to said axes.

19. A linked belt comprising in combination:
   a plurality of like modules, each of said modules including a first plurality of link ends of like width, a second plurality of link ends each of said like width, and an intermediate section integrally formed with and joining said first and second pluralities of link ends,
   said link ends of each said modules being releasably engaged between and substantially in contact with link ends of an adjacent module except for individual link ends disposed at the extreme sides of said belt; and
   means for pivotally connecting said modules at engaged link ends,
   said modules being arranged in staggered relation with a side edge of each module being disposed intermediate the side edges of an adjacent pivotally connected module so that relative motion of each and adjacent modules parallel to a line through engaged link ends thereof is prevented by the engagement of said engaged link ends.

20. A belt as defined in claim 19 wherein said modules are arranged so that a side of each module is disposed substantially centrally between the sides of an adjacent module.

21. A belt as defined in claim 19 wherein each of the link ends of each plurality thereof are spaced from one another by a similar distance.

22. A belt as defined in claim 19 wherein there are an even number of interspaces between the link ends of said first plurality and a like number between the link ends of said second plurality.

23. A belt as defined in claim 22 wherein said even number is twenty.

24. A belt as defined in claim 22 including fractions of said modules disposed at the sides of said belt so that the width of said belt is substantially uniform.

25. A belt as defined in claim 29 wherein each of said fractions have first and second pluralities of link ends, each plurality defining a whole number of said interspaces, said whole number being less than said even number.

26. A belt as defined in claim 22 wherein each of said modules has disposed to one side thereof at least one fraction of a like module to form a row wherein like pluralities of link ends of said module and said fractions are aligned to pivot about a common axis, said fraction having first and second pluralities of link ends each plurality defining a like whole number of interspaces between link ends.

27. A belt as defined in claim 26 wherein each row includes a single said fraction which has half the number of interspaces as said module.

28. A belt as defined in claim 22 wherein each of said modules has disposed to one side thereof at least another module and at least one fraction of a like module to form a row wherein like pluralities of link ends of said module and said fraction are aligned to pivot about a common axis, said fraction having first and second pluralities of link ends each plurality defining a like whole number of interspaces between link ends.

* * * * *